(12) United States Patent
Ma et al.

(10) Patent No.: US 7,673,993 B2
(45) Date of Patent: Mar. 9, 2010

(54) PROJECTION SYSTEM USING REFLECTIVE POLARIZERS

(75) Inventors: Jiaying Ma, Maplewood, MN (US); Gregory E. Gilligan, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1111 days.

(21) Appl. No.: 11/315,723

(22) Filed: Dec. 22, 2005

(65) Prior Publication Data

US 2007/0146638 A1 Jun. 28, 2007

(51) Int. Cl.
| G03B 21/14 | (2006.01) |
| G02B 5/30 | (2006.01) |
| G02B 27/28 | (2006.01) |
| H04N 9/07 | (2006.01) |
| G02F 1/1335 | (2006.01) |

(52) U.S. Cl. ............ 353/20; 353/31; 353/84; 359/487; 359/634; 359/496; 359/583; 359/501; 359/490; 348/338; 348/339; 349/5; 349/114

(58) Field of Classification Search .......... 353/20, 353/31, 84; 359/487, 247, 634, 496, 583, 359/586, 501, 490; 348/338, 339; 349/113, 349/114, 5
See application file for complete search history.

(56) References Cited

U.S. PATENT DOCUMENTS

| 4,974,132 A | 11/1990 | Naum |
| 5,826,959 A | 10/1998 | Atsuchi |
| 5,882,774 A | 3/1999 | Jonza et al. |
| 5,962,114 A | 10/1999 | Jonza et al. |
| 6,109,767 A | 8/2000 | Rodriguez |
| 6,288,844 B1 | 9/2001 | Edlinger et al. |
| 6,486,997 B1 | 11/2002 | Bruzzone et al. |
| 6,529,250 B1 | 3/2003 | Murakami et al. |

(Continued)

FOREIGN PATENT DOCUMENTS

EP  1 431 781  6/2004

(Continued)

OTHER PUBLICATIONS

"Metric Beam Dump", Edmund Optics Inc., Barrington, New Jersey, USA [on line], [retrieved from the internet on Oct. 6, 2005], URL www.edmundoptics.com/onlinecatalog/DisplayProduct.cmf?productid=2193 pp. 1-2.

(Continued)

*Primary Examiner*—Georgia Y Epps
*Assistant Examiner*—Magda Cruz

(57) ABSTRACT

A projection system comprising a first imaging component, at least a second imaging component, and a color combiner. The first and second imaging components each comprise an imager and a reflective polarizer that is configured to at least partially separate a light beam from the imager into a first portion and second portion, where the first portion and the second portion have substantially orthogonal polarization states. The first portions of the light beams are directed in the same direction above or below a plane defined by the second portions of the light beams. The color combiner is configured to combine the second portions of the light beams, where the second portions of the light beams have substantially orthogonal polarization states prior to entering the color combiner.

20 Claims, 7 Drawing Sheets

U.S. PATENT DOCUMENTS

| | | |
|---|---|---|
| 6,532,044 B1 | 3/2003 | Conner et al. |
| 6,550,919 B1 | 4/2003 | Heine |
| 6,557,999 B1 | 5/2003 | Shimizu |
| 6,592,224 B2 | 7/2003 | Ito et al. |
| 6,609,795 B2 | 8/2003 | Weber et al. |
| 6,646,806 B1 | 11/2003 | Bierhuizen |
| 6,669,344 B2 | 12/2003 | Ishii |
| 6,719,426 B2 | 4/2004 | Magarill et al. |
| 6,778,228 B2 | 8/2004 | Murakami et al. |
| 6,811,261 B2 | 11/2004 | Kurumisawa |
| 6,914,654 B2 | 7/2005 | Janssen |
| 6,916,440 B2 | 7/2005 | Jackson et al. |
| 6,936,209 B2 | 8/2005 | Jackson et al. |
| 6,939,499 B2 | 9/2005 | Merrill et al. |
| 6,949,212 B2 | 9/2005 | Merrill et al. |
| 7,077,526 B2 | 7/2006 | Overmann et al. |
| 7,101,047 B2 | 9/2006 | Florence et al. |
| 7,152,979 B2 | 12/2006 | Ellis et al. |
| 7,377,655 B2 | 5/2008 | Manabe et al. |
| 2003/0025879 A1 | 2/2003 | Ishii |
| 2003/0071888 A1 | 4/2003 | Roddy et al. |
| 2003/0227680 A1 | 12/2003 | Chen et al. |
| 2004/0066492 A1 | 4/2004 | Nakashima et al. |
| 2004/0080938 A1* | 4/2004 | Holman et al. ............... 362/231 |
| 2004/0085634 A1 | 5/2004 | Stahl et al. |
| 2004/0130784 A1 | 7/2004 | Williams et al. |
| 2004/0184006 A1 | 9/2004 | Okuyama et al. |
| 2004/0189948 A1 | 9/2004 | Okuyama et al. |
| 2004/0227898 A1 | 11/2004 | Ma et al. |
| 2004/0227994 A1* | 11/2004 | Ma et al. .................... 359/487 |
| 2005/0007555 A1 | 1/2005 | Manabe et al. |
| 2005/0012996 A1 | 1/2005 | Miyazawa et al. |
| 2005/0062936 A1 | 3/2005 | Okuyama et al. |
| 2006/0028620 A1 | 2/2006 | Conner |
| 2006/0044516 A1 | 3/2006 | Inoko |
| 2006/0103791 A1 | 5/2006 | Zhu et al. |
| 2006/0215117 A1* | 9/2006 | Aastuen et al. ............... 353/20 |
| 2006/0262275 A1 | 11/2006 | Domroese et al. |

FOREIGN PATENT DOCUMENTS

| | | |
|---|---|---|
| JP | 06222321 | 8/1994 |
| KR | 10-2004-0007775 | 1/2004 |
| KR | 10-2005-0055235 | 6/2005 |
| WO | WO 2004/072713 | 8/2004 |

OTHER PUBLICATIONS

"Black Reflections", [retrieved from the internet on Oct. 6, 2005], URL www.mazepath.com/uncleal/blade.htm.

"10BD—Beam Dump", Standa in Lithuania, Vilnius, Lithuania, [retrieved from the internet on Oct. 6, 2005], URL www.stand.lt/products/catalog/lasers_laser_accessories?item=202&prod+beam_dump.

Campbell, P., et al., "Light trapping and reflection control in solar cells using tilted crystallographic surfaces textures", *Solar Energy Materials and Solar Cells 31* (1993) 133-153 North Holland.

U.S. Appl. No. 11/315,811 entitled "Polarizing Beamsplitter Assembly" filed Dec. 22, 2005.

Electronic Projection—Fixed Resolution Projectors, ANSI/NAPM IT7.228-1997.

* cited by examiner

PROJECTION SYSTEM USING REFLECTIVE POLARIZERS

FIELD OF THE INVENTION

The present invention relates to projection systems that incorporate polarization separation devices. In particular, the present invention relates to projection systems using reflective polarizers with liquid crystal imagers.

BACKGROUND

A projection system typically includes a light source, illumination optics, one or more imagers, projection optics, and a projection screen. The illumination optics collect light from the light source and direct that light in a predetermined manner to the imager(s). The imager(s) are typically polarization-rotating, image-forming devices, such as liquid crystal display imagers, which operate by rotating the polarization of the light to produce an image corresponding to digital video signals. The projection optics then magnify the image and project it onto the projection screen.

Imagers used in projection systems typically rely on polarizers to separate light into a pair of orthogonal polarization states (e.g., s-polarization and p-polarization). The separation generally involves transmitting light having a desired polarization state and absorbing the majority of the light having an undesired polarization state. Such polarizers, however, absorb a substantial amount of light energy, which is converted to heat. During extended periods of use, the generated heat may build up and damage the polarizers, thereby diminishing the polarization properties. This accordingly reduces the quality of the projected images over time. Typically, high-speed air flows are provided over the polarizers to maintain the polarizer temperatures below acceptable limits. However, the required volumetric flow rates may be high, and the size and number of fans needed in the projection system can consume a significant amount of electrical power and space in the projection system, in addition to generating distracting noise.

SUMMARY OF THE INVENTION

The present invention relates to a projection system that includes at least two imaging components and a color combiner. The imaging components each include a reflective polarizer that is configured to at least partially separate a light beam into a first portion and second portion, where the first portion and the second portion have substantially orthogonal polarization states. The first portions of the light beams from the imaging component are directed in the same direction above or below a plane defined by the second portions of the light beams. The color combiner is configured to combine the second portions of the light beams, where the second portions of the light beams from the imaging components have substantially orthogonal polarization states prior to entering the color combiner.

The above summary of the present invention is not intended to describe each illustrated embodiment or every implementation of the present invention. The following figures and detailed description more particularly exemplify these embodiments.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

Figure 1:
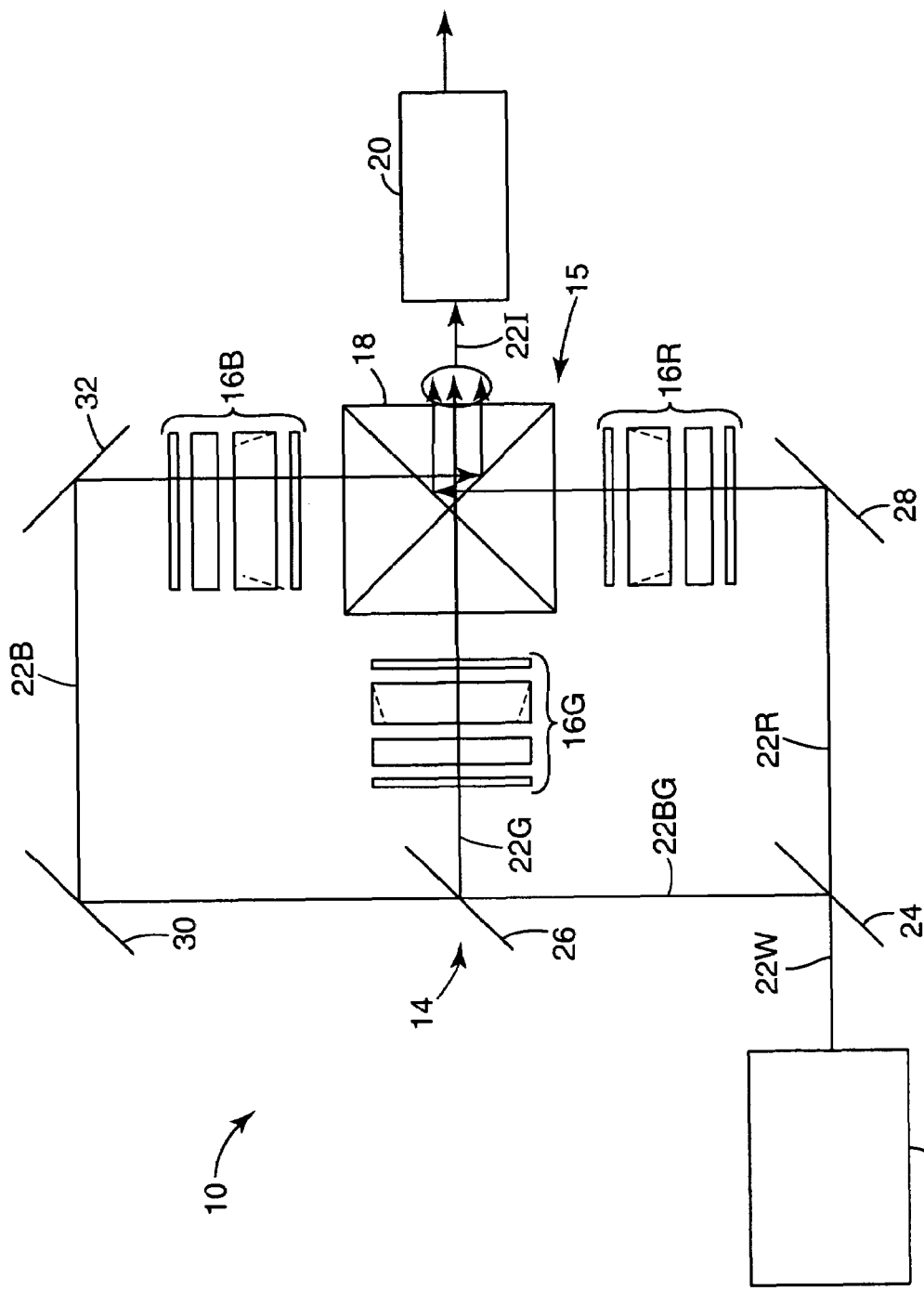
FIG. 1 is a top schematic view of a projection system of the present invention.

FIG. 1 is a top schematic view of projection system 10 of the present invention, which is a suitable system for displaying high-contrast, bright images with a variety of optical imager systems, such as front and rear projection systems, projection displays, head-mounted displays, virtual viewers, heads-up displays, and optical computing systems. Projection system 10 includes light source 12, color-separation optics 14, optic core 15 (which includes imaging components 16R, 16B, and 16G, and color combiner 18), and projection lens 20. As discussed below, imaging components 16R, 16B, and 16G are configured to direct non-image light beams in the same general direction above a plane defined by image-imposed light beams that are output from imaging components 16R, 16B, and 16G (i.e., a plane defined by the page of FIG. 1). Accordingly, the non-image light beams are directed in the same direction out of the plane of FIG. 1 toward (or away from) a viewer. This removes the non-image light beams to a location above (or below) of the optic paths of projection system 10 (i.e., the optic paths shown in FIG. 1), where the non-image light beams may be conditioned to reduce heat generation.

Light source 12 may be a lamp and curved (e.g., parabolic and concave) reflector for emitting light beam 22W (white light beam) toward color-separation optics 14. Suitable lamps for light source 12 include metal halide arc lamps, such as ultrahigh-pressure mercury lamps. Prior to reaching color-separation optics 14, light beam 22W may be pre-conditioned with a variety of optical components (not shown), such as pre-polarizers (e.g., polarization conversion systems), condenser lenses, integrator lenses, and superimposing lenses. Pre-polarizers may be used to at least partially polarize light beam 22W, which involves conditioning light beam 22W into a linearly polarized light component.

Color-separation optics 14 includes dichroic mirrors 24 and 26, and fold reflectors 28, 30, and 32, where fold reflectors 28, 30, and 32 are reflection mirrors for directing optical paths of light beams. Color-separation optics 14 may also include condenser lenses (not shown) for reducing divergence angles and relaying received light beams. Light beam 22W initially travels to dichroic mirror 24, which is a color-wavelength separating mirror that transmits red-wavelength light (about 600 nanometers to about 700 nanometers) and reflects light in the remaining color spectrum. Accordingly, dichroic mirror 24 transmits light beam 22R (i.e., red-wavelength portion of light beam 22W) toward fold reflector 28 and imaging component 16R, and reflects light beam 22GB (i.e., blue-green wavelength portions of light beam 22W) toward dichroic mirror 26.

Dichroic mirror 26 is a color-wavelength separating mirror that transmits blue-wavelength light (about 400 nanometers to about 500 nanometers) and reflects light in the remaining color spectrum, which is the green-wavelength (about 500 nanometers to about 600 nanometers). Accordingly, dichroic mirror 26 transmits light beam 22B (i.e., blue-wavelength portion of light beam 22GB) toward fold reflectors 30 and 32, and imaging component 16B, and reflects light beam 22G (i.e., green-wavelength portion of light beam 22GB) toward imaging component 16G.

Imaging components 16R, 16B, and 16G are generally disposed between color-separation optics 14 and color combiner 18. Imaging components 16R, 16B, and 16G each impose images on received light beams and relay the image-imposed light beams to color combiner 18. As discussed further below, imaging components 16R, 16B, and 16G may include total internal reflection polarizing beam splitters (PBSs), which are configured to direct non-image light beams in the same general direction above (or below) the plane defined by the image-imposed light beams. This directs the non-image light beams above (or below) the optic paths of projection system 10 (i.e., the optic paths shown in FIG. 1), thereby preventing the non-image light beams from interfering with the optic paths of projection system 10. Additionally, the non-image light beams may directed toward a single heat removal component (e.g., a heat sink, not shown in FIG. 1) that absorbs the light energy. This transfers the heat generation incurred by the non-image light beams from the locations that are heat sensitive (e.g., imaging components 16R, 16B, and 16G) to an offset location where the heat generation may be managed with a single heat removal reduction component.

Color combiner 18 in this embodiment is an X-cube color combiner that includes four right-angled prisms separated by a first dichroic multi-layered (typically inorganic) film that reflects red-wavelength light and a second dichroic multi-layered film that reflects blue-wavelength light. Alternatively, color combiner 18 may include only a pair of dichroic mirrors (without prisms). Color combiner 18 combines the image-imposed portions of light beams 22R, 22G, and 22B into a single image light beam (i.e., light beam 22I). In particular, the imaged-portion of light beam 22R reflects from the dichroic multi-layered film that reflects red light, the image portion of light beam 22B reflects from the dichroic multi-layered film that reflects blue light, and the image portion of light beam 22G substantially transmits through the pair of dichroic multi-layered films. The resulting single image light beam 22I is then transmitted to projection lens 20, where light beam 22I is enlarged and projected onto a screen (not shown). Accordingly, projection system 10 may produce high-contrast, bright images for viewing while also removing the non-image light beam energy to a location offset from the polarizing elements. This preserves the product life of the polarizing elements, allowing projection system 10 to continue to produce high-contrast, bright images over extended periods of time.

In an alternative embodiment, projection system 10 may include two imaging components, rather than the three imaging components shown in FIG. 1. Two-imaging component arrangements typically have a first imaging component dedicated to the green-wavelength light beam and a second imaging component sequenced between the red and blue-wavelength light beams. Examples of two-imaging component arrangements are described in Ma et al., U.S. Patent Publication No. 2004/0227898.

Figure 2:
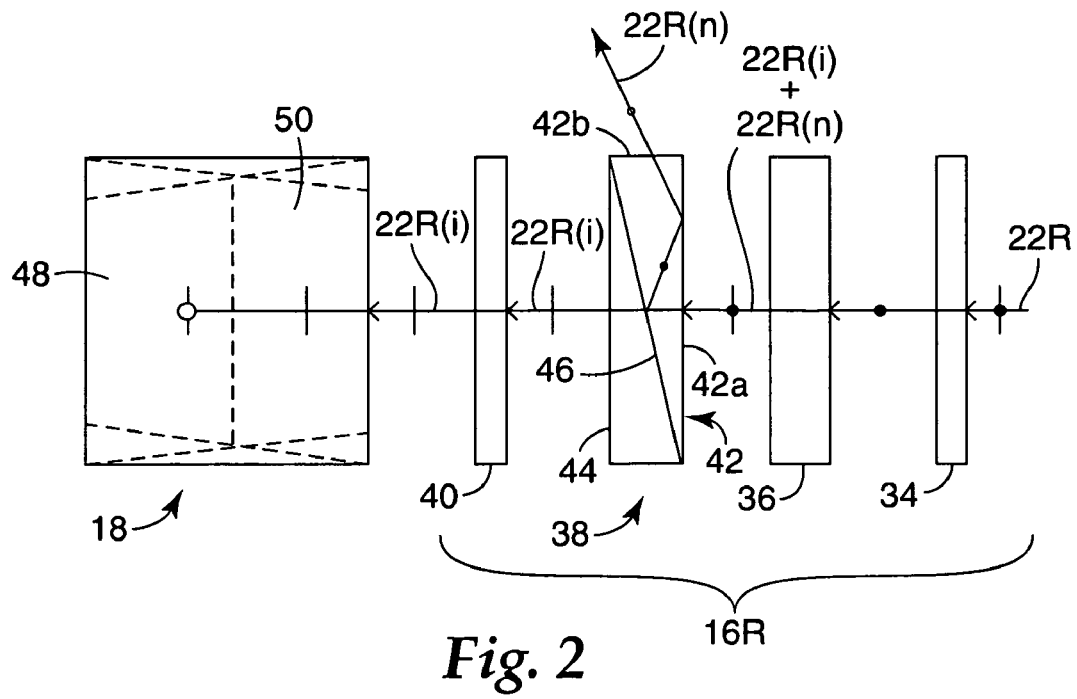
FIG. 2 is an expanded side schematic view of imaging components of the projection system, which focuses on a red-wavelength imaging component in use with a color combiner.

FIG. 2 is an expanded side schematic view of optic core 15, which focuses on imaging component 16R in use with color combiner 18. Imaging component 16R includes entrance polarizer 34, transmissive imager 36, PBS 38, and exit polarizer 40, which are respectively aligned along the optical path of light beam 22R. A person skilled in the art may understand that various elements of imaging component 16R (and imaging components 16B and 16G) are optional components, and that additional components may be utilized as well.

Entrance polarizer 34 (e.g. a pre-polarizing film) transmits a first portion of light beam 22R having a first polarization state to transmissive imager 36 and absorbs or reflects a second portion of light beam 22R having a second polarization state that is orthogonal to the first polarization state. As a result, the light beam transmitted to transmissive imager 36 is substantially in the first polarization state. In accordance with conventional symbols, light beams in the first polarization state will be here labeled with a dot "·" (representing a first orthogonal electric field segment that extends out of the plane of the paper, orthogonal to the view of FIG. 2), and light beams in the second polarization state (with the electric field vector of the light polarized in the plane of the paper) are labeled with a second orthogonal segment "|". As discussed above, if light beam 22W was at least partially pre-polarized to a given polarization state, light beam 22R would initially be at least partially polarized in the same given polarization state when reaching imaging component 16R.

Transmissive imager 36 in this embodiment is a liquid crystal imager that modulates the polarization of received light beam 22R in accordance with an associated image signal, thereby imposing an image on light beam 22R. Examples of suitable liquid crystal imagers for transmissive imager 36 include LCD-based image-forming devices, such as High-Temperature Poly-Silicon (HTPS) transmissive LCD panels. Other embodiments based on reflective imagers, such as liquid crystal on silicon (LCOS) panels are also contemplated by the present invention. Voltages may be applied to various pixels of transmissive imager 36 based on an associated image signal. This imposes an image on light beam 22R, where the image portion of light beam 22R (referred to as "light beam 22R(i)") may be modulated into the second polarization state, while the non-image portion of light beam 22R (referred to as "light beam 22R(n)") remains in the first polarization state. Accordingly, the optical path of light beam 22R traveling from transmissive imager 36 to PBS 38 includes light beam 22R(n), which is in the first polarization state, and light beam 22R(i), which is in the second polarization state.

PBS 38 in this embodiment includes input prism 42, output prism 44, and reflective polarizing film 46. Input prism 42 and output prism 44 are low-birefringence prisms (i.e., polarizing film covers) disposed adjacent each other on opposing sides of reflective polarizing film 46, where input prism includes entrance surface 42a and top surface 42b. Input prism 42 and output prism 44 may be constructed from any light transmissive material having a suitable refractive index to achieve the desired purpose of PBS 38. A "light transmissive" material is one that allows at least a portion of incident light to transmit through the material. Suitable materials for use as prisms include ceramics, glass, and polymers. Preferably, input prism 42 and output prism 44 are made of isotropic materials, although other materials may be used. In the embodiment shown in FIG. 2, input prism 42 and output prism 44 may be designed so that light beam 22R(n) reflecting from reflective polarizing film 46 can meet total internal reflection conditions along entrance surface 42a of input prism 42. The design of such prisms is described in Magarill et al., U.S. Pat. No. 6,719,426.

As shown in FIG. 2, light beam 22R is transmitted through entrance surface 42a of input prism 42 and contacts reflective polarizing film 46. Examples of suitable polarizing films for reflective polarizing film 46 include reflective, multi-layer polymeric, matched z-index polarizer (MZIP) films (discussed below). Such films are Cartesian polarizers, conventionally oriented to transmit light of approximately p-polarization, and to reflect light of approximately s-polarization with respect to the plane of incidence of the incoming light on the film.

While a multi-layer film is a preferred embodiment, other Cartesian polarizers, such as wire-grid polarizers and Mac-Neille polarizers, may alternatively be used for reflective polarizing film 46. Such alternative polarizers desirably exhibit high thermal conductivity and low thermal birefringence. Examples of additional suitable reflective polarizers for use with the present invention include those disclosed in Miyazawa et al., U.S. Patent Application Publication No. 2005/0012996.

Because of the angle of incidence of light beam 22R with respect to reflective polarizing film 46, the portion of light beam 22R that is in the first polarization state (i.e., light beam 22R(n)) is oriented as s-polarized light relative to reflective polarizing film 46. Similarly, the portion of light beam 22R that is in the second polarization state (i.e., light beam 22R(i)) is oriented as p-polarized light relative to reflective polarizing film 46. Accordingly, light beam 22R(n) is reflected from reflective polarizing film 46 and light beam 22R(i) transmits through reflective polarizing film 46.

Because reflective polarizing film 46 is a reflective polarizer rather than an absorptive-type polarizer, light beam 22R(n) is not absorbed by reflective polarizing film 46. As such, light beam 22R(n) is not converted to heat at reflective polarizing film 46, allowing reflective polarizing film 46 to remain relatively cool. Suitable operating temperatures for PBS 38 typically range from about 25° C. to about 45° C., without forced air cooling. Comparatively, current absorptive-type polarizers require appropriately-designed forced air cooling to achieve acceptable temperatures (typically around 70° C.), which sets the limit of light intensity on the polarizers and imagers. Light intensity through the polarizer and its potential to degrade the polarizer can determine the size of imagers and polarizers that may be used. The imagers are the main cost components of a typical projection system, and a decrease in size of the imager (thereby increasing the light intensity through the polarizer) can reduce the cost of the imager. Thus, reflective polarizing film 46 provides a level of temperature control that can be achieved by relying only on natural convection heat transfer (i.e., without the need for fans). Additionally, smaller imagers (e.g., imager 36) may be used for the same amount of light output from projector system 10 so that lower cost projectors can be designed using increased light intensity.

As further shown in FIG. 2, light beam 22R(n) is reflected back into input prism 42, where it is totally internally reflected on entrance surface 42a, and it exits input prism 42 from top surface 42b. As discussed below, a similar arrangement is obtained with imaging components 16B and 16G, such that the non-image portions of light beams 22R, 22B, and 22G are reflected in the same general direction above the plane defined by light beam 22R(i) and the image portions of light beams 22B and 22G.

Light beam 22R(i) that transmits through polarizing film 46 and output prism 44 travels toward exit polarizer 40. Exit polarizer 40 may be a polarizing film that also transmits light in the second polarization state (i.e., approximately p-polarization relative to PBS 38) and absorbs or reflects any residual portions of light in the first polarization state (i.e., approximately s-polarization relative to PBS 38) that transmitted through reflective polarizing film 46 and output prism 44. As a result, light beam 22R(i) transmits through exit polarizer 40, and any residual portion of light beam 22R(n) is absorbed or reflected by exit polarizer 40. Exit polarizer 40 provides a level of redundancy in the polarization steps to enhance the contrast of light beam 22R(i) prior to entering color combiner 18.

In this embodiment, color combiner 18 is an "SPS" type X-cube. Color combiner 18 includes a pair of crossing dichroic films 48 and 50 that respectively reflect red-wavelength light and blue-wavelength light, and transmit green wavelength light. Color combiner 18 reflects s-polarized light more strongly than p-polarized light. It also transmits p-polarized light more strongly than s-polarized light, particularly for green light. Light beam 22R(i) travels toward color combiner in the second polarization state, which, as discussed above, was approximately p-polarization with respect to reflective polarizing film 46 of PBS 38. However, because of the plane of incidence of light beam 22R(i) with respect to dichroic mirror film 48 of color combiner 18, the second polarization state is oriented as s-polarized light relative to dichroic film 48. As such, light beam 22R(i) (which is in the second polarization state) reflects from dichroic film 48 toward projection lens 20, which is located in a direction out of the plane defined by the view in FIG. 2, toward a viewer of FIG. 2.

Figure 3:
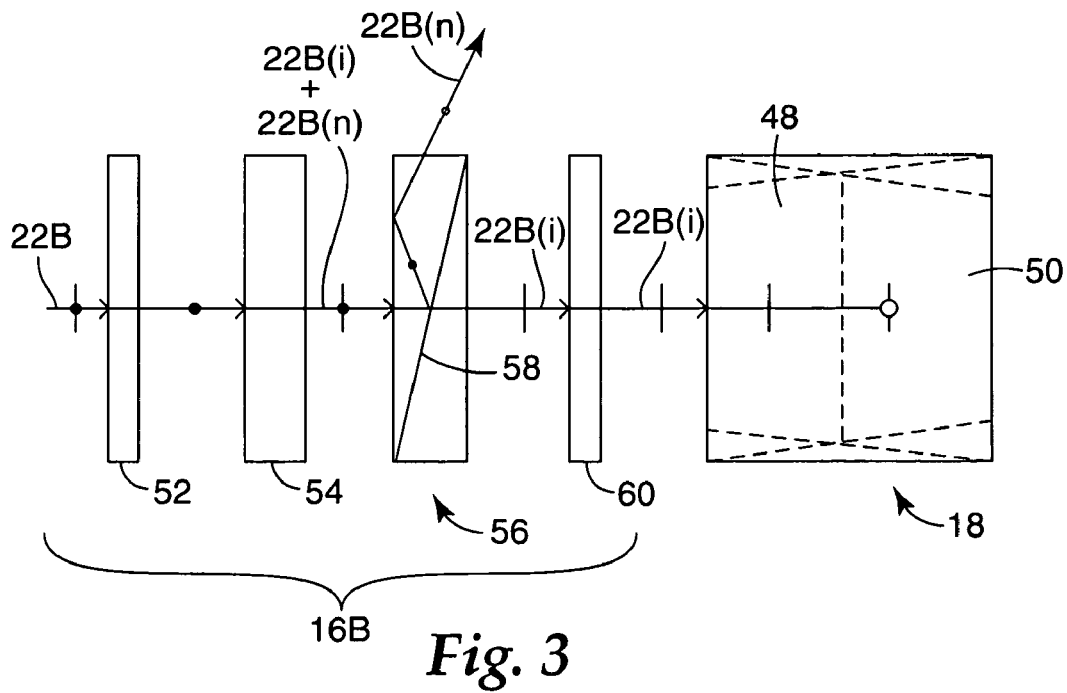
FIG. 3 is an expanded side schematic view of imaging components of the projection system, which focuses on a blue-wavelength imaging component in use with a color combiner.

FIG. 3 is another expanded top schematic view of optic core 15, which focuses on imaging component 16B in use with color combiner 18. Imaging component 16B includes entrance polarizer 52, transmissive imager 54, PBS 56 (containing reflective polarizing film 58), and exit polarizer 60, which are respectively aligned along the optic path of light beam 22B, and function in an identical manner to the corresponding components of imaging component 16R, discussed above in FIG. 2. As such, the non-image portion of light beam 22B (referred to as "light beam 22B(n)"), which is in the first polarization state (s-polarization relative to reflective polarizing film 58), is reflected out of the top of PBS 56. Accordingly, light beam 22B(n) is reflected in the same general direction as light beam 22R(n) above the plane defined by light beams 22R(i) and 22B(i), and the image portion of light beam 22G.

The image portion of light beam 22B (referred to as "light beam 22B(i)"), which is in the second polarization state (p-polarization relative to reflective polarizing film 58), transmits through reflective polarizing film 58 toward exit polarizer 60 and color combiner 18. Light beam 22B(i) travels toward color combiner 18 in the second polarization state. As discussed above for light beam 22R(i), because of the angle of incidence of light beam 22B(i) with respect to dichroic film 50 of color combiner 18, the second polarization state is oriented as s-polarized light relative to dichroic film 50. As such, light beam 22B(i) (which is in the second polarization state) reflects from film dichroic 50 (in a direction out of the plane defined by the view of FIG. 3) toward projection lens 20.

Figure 4:
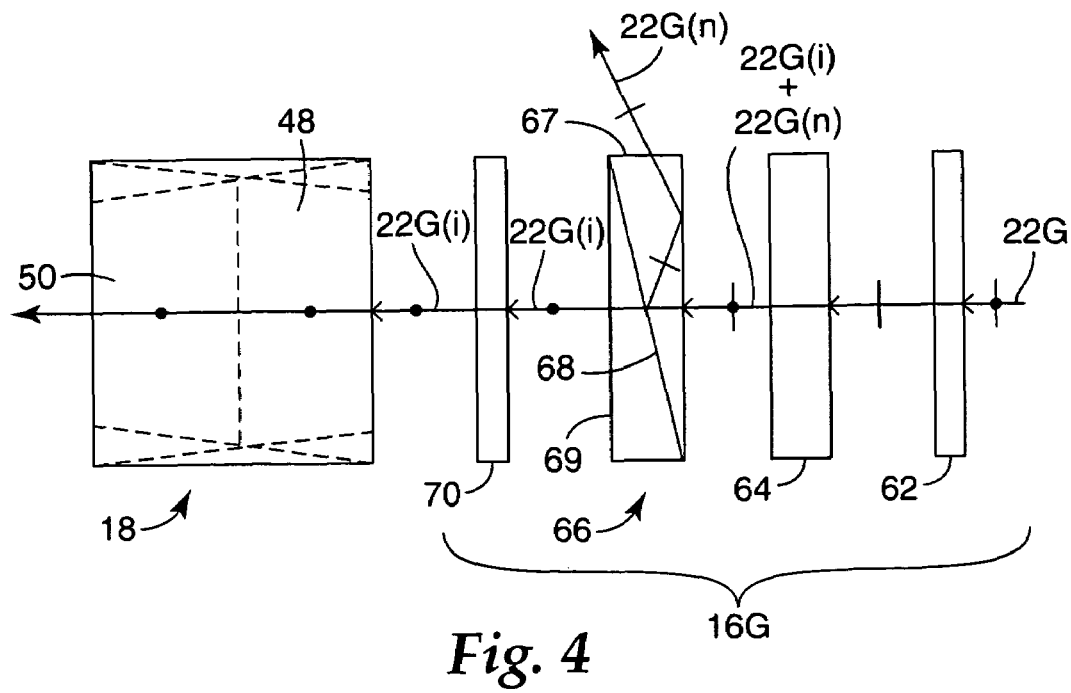
FIG. 4 is an expanded side schematic view of imaging components of the projection system, which focuses on a green-wavelength imaging component in use with a color combiner.

FIG. 4 is another expanded top schematic view of optic core 15, which focuses on imaging component 16G in use with color combiner 18. Imaging component 16G includes entrance polarizer 62, transmissive imager 64, PBS 66 (containing reflective polarizing film 68), and exit polarizer 70, which are respectively aligned along the optic path of light beam 22G, and function in a similar manner to the corresponding components of imaging components 16R and 16B, discussed above in FIGS. 2 and 3. One exception to the similarities is that reflective polarizing film 68 is oriented to reflect nominal p-polarized light and transmit s-polarized light. This may be accomplished by orienting the inherent polarization reflection direction of the internal structure of reflective polarizing film 68 on the input prism at a 90° rotation relative to the orientations of reflective polarizing films 46 and 58 of imaging component 16R and 16B. Additionally, if light beam 22G is pre-polarized prior to entering imaging component 16G, a ½-wave plate may be disposed in front of entrance polarizer 62 to rotate the polarization state of light beam 22G.

Accordingly, the non-image portion of light beam 22G (referred to as "light beam 22G(n)"), which is in the second polarization state (nominally the p-polarization relative to reflective polarizing film 68), and is reflected out of the top of PBS 66. Light beam 22G(n) is also reflected in the same general direction as light beam 22R(n) and 22B(n) above the plane defined by light beams 22R(i), 22B(i), and 22G(i). In one embodiment, PBS 66 includes input prism 67 and output prism 69, where input prism 67 and output prism 69 each have a refractive index that is close to the refractive indices of the outer layers of reflective polarizing film 68. This allows light beam 22G(i) to transmit through PBS 66 with high transmission efficiency, by minimizing the Fresnel reflections at the dielectric interfaces between the prisms 76, 78, and the film 68.

The image portion of light beam 22G (referred to as "light beam 22G(i)"), which is in the first polarization state (nominal s-polarization relative to reflective polarizing film 68, but aligned with the "transmit" polarization direction of the internal structure of the "rotated" multilayer optical film), transmits through reflective polarizing film 68 toward exit polarizer 70 and color combiner 18. The polarizing film 68 is rotated 90 degree with respective to polarizing films 46 and 58 in the red and blue light paths (shown in FIGS. 2 and 3). This arrangement of the polarizing film 68 allows p-polarized light to be reflected by the film 68, and s-polarized light be transmitted by the film 68. The transmitted light beam 22G(i) travels toward color combiner 18 in the first polarization state, which is p-polarized light with respect to the dichroic mirror coatings 48 and 50 in the color combiner 18. P-polarized light in the green-wavelength optic path has much higher transmission through the color combiner 18 than s-polarized light. If light beam 22G(i) remained as s-polarized light relative to dichroic films 48 and 50, the transmission of light beam 22G(i) through color combiner 18 would be decreased.

Figure 5B:
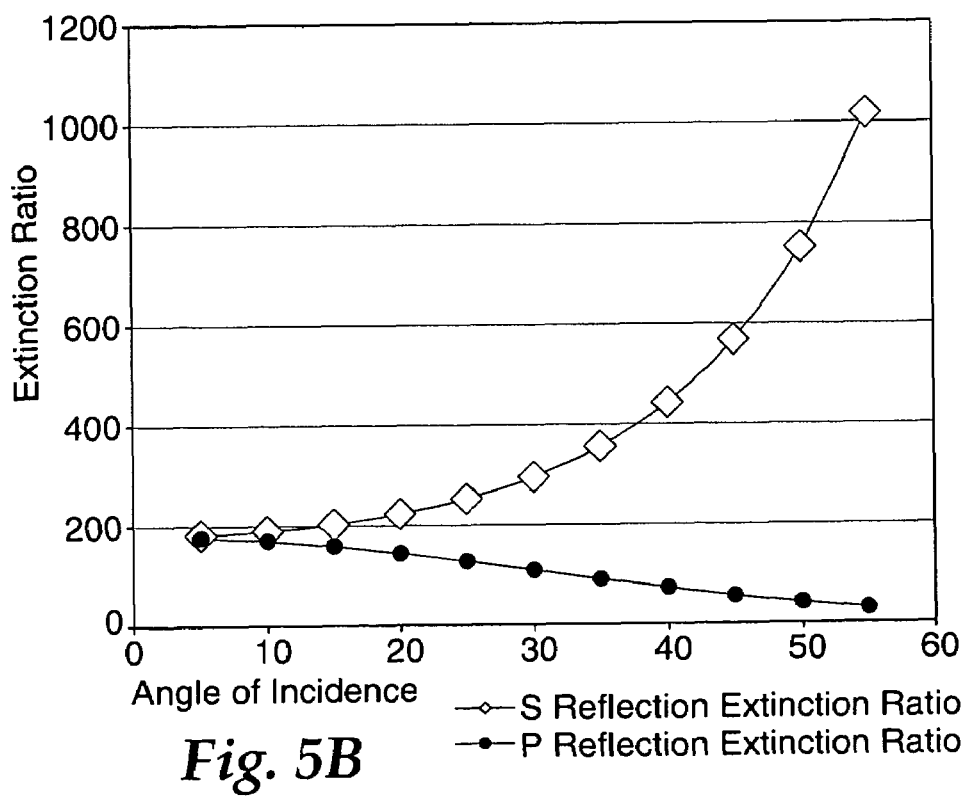
FIG. 5B is a graphical representation showing the extinction ratios for an MZIP reflective polarizing film versus the incident angle of the incoming light beam relative to the reflective polarizing film.
Figure 5A:
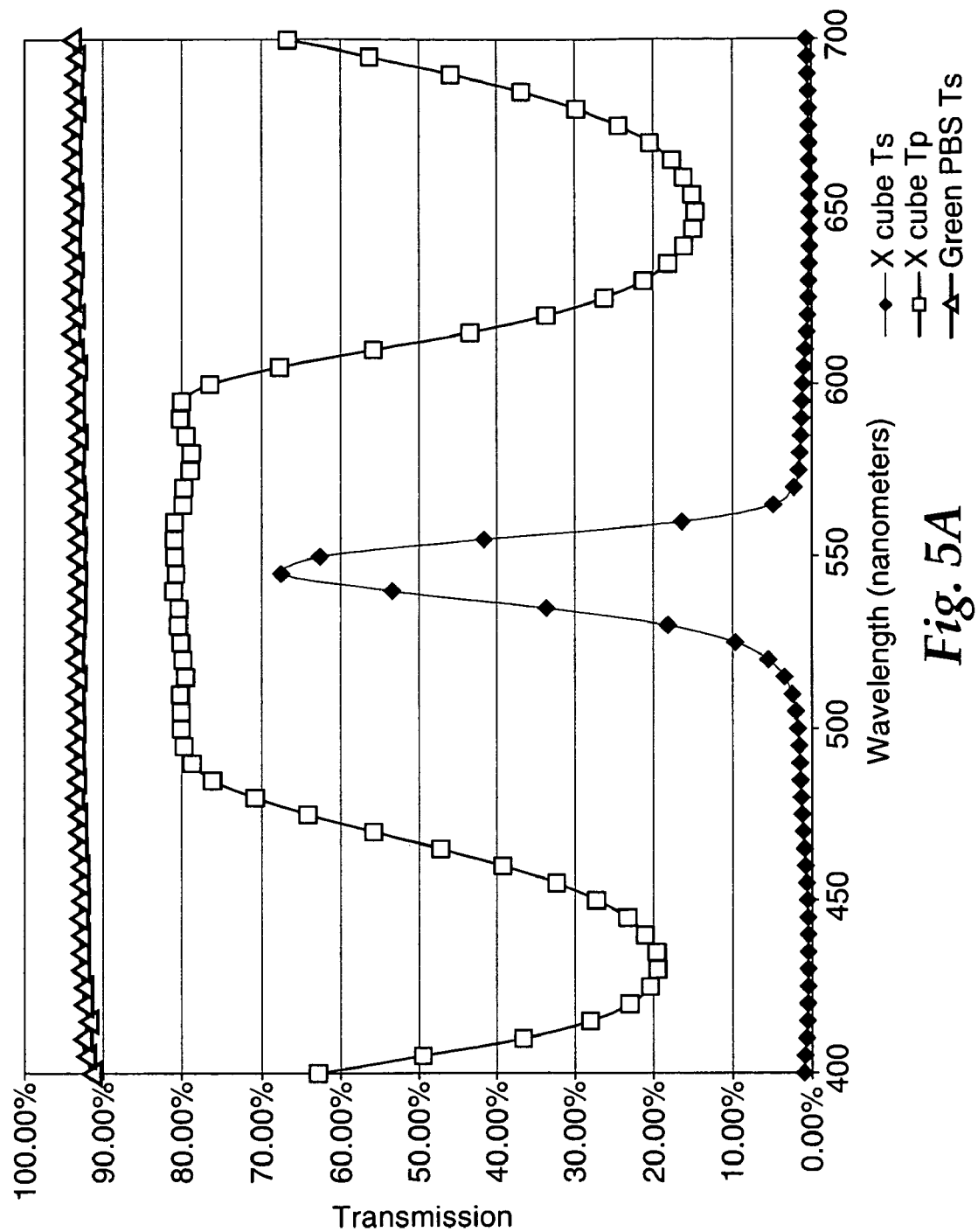
FIG. 5A is a graphical representation showing the transmission of light through the color combiner versus the wavelength of the light, for light in a p-polarization state and in an s-polarization state.

The decrease in transmission is shown in FIG. 5A, which is a graphical representation showing the transmission of light through a color combiner versus the wavelength of the light for light in a p-polarization state and in an s-polarization state with respect to the color filters on the diagonals of the X-cube, and also the transmission of light through PBS 66 for light in an s-polarization light with respect to reflective polarizing film 68. As shown, for light having a wavelength ranging from about 500 nanometers to about 600 nanometers (i.e., green-wavelength light), the light in the p-polarization state relative to dichroic films 48 and 50 of color combiner 18 has a broader range of transmission and a higher transmission intensity compared to the light in the s-polarization state. It should be noted that the angle of incidence of light onto the dichroic films 48 and 50 is at around 45 degrees. Thus, light beam 22G(i) is desirably transmitted through color combiner 18 in a p-polarization state relative to dichroic films 48 and 50, as shown above in FIG. 4.

Moreover, p-polarized light transmits more efficiently through interfaces of two dielectric materials (e.g., the interfaces between reflective polarizing films 46, 58, and 68 and their respective input and output prisms) in comparison to s-polarized light. As a result, light beam 22G(i), which transmits through reflective polarizing film 68 in the first polarization state (nominally s-polarized relative to reflective polarizing film 68), has a lower transmission intensity than would be attainable if light beam 22G(i) was in the second polarization state (nominally p-polarized relative to reflective polarizing film 68). However, in the embodiment shown in FIG. 4, the maximum incident angle of the light in light beam 22R relative to reflective polarizing film 68 is small (e.g., about 25° for the central ray of the incident light cone). It should be noted that throughout the specification, when applicant refers to incident angle measurements, it is with respect to the central ray of the incident light cone impacting the relevant surface. In this embodiment, the incident angle of 25 degrees was chosen to meet the total internal reflection conditions in "compound" PBS 66. Other angles of incidence may be more appropriate, depending on such factors as the materials forming the prisms of the PBS. The transmission of s-polarized light at these small incident angles is only slightly lower than the transmission of p-polarized light. In fact, as shown in FIG. 5A, s-polarized light in the green-wavelength transmits through the MZIP-type reflective polarizing films (discussed previously) at an angle of incidence with the film of about 25° with a transmission greater than 90%.

Overall, this arrangement still offers a high transmission efficiency for green-wavelength light, particularly if index-matched input and output prisms are used on reflective polarizing film 68. Moreover, the arrangement of optic core 15 also allows light beams 22R(n), 22B(n), and 22G(n) to be reflected in the same general direction above the plane defined by light beams 22R(i), 22B(i), and 22G(i), thereby allowing light beams 22R(n), 22B(n), and 22G(n) to be conditioned with a single heat removal component.

Rotating reflective polarizing film 68 to reflect p-polarized light and transmit s-polarized light also lowers the extinction ratio of PBS 66, where the extinction ratio is defined as the ratio between the light intensity of the transmitted light in the desired polarization state over the light intensity of the transmitted light in the orthogonal polarization state. Generally, high extinction ratios are required for high contrast in projection systems. As shown in FIG. 5B, the extinction ratio for a p-polarized reflective polarizing film (e.g., reflective polarizing film 68) decreases with an increase in the incident angle of the incoming light beam (e.g., light beam 22G) relative to the reflective polarizing film. Therefore, reflective polarizing film 68 has a lower extinction ratio than reflective polarizing films 46 and 58 of imaging components 16R and 16B, respectively.

However, since the incident angle of the incoming light beams (e.g., light beams 22R, 22B, and 22G) are relatively small (e.g., about 25° or less), the extinction ratio is still high enough for thermal management purposes. Examples of suitable extinction ratios include at least about 5:1 with a light beam conditioned at an f/# less than about 3.0 in one embodiment, and in another embodiment at an f/# less than about 2.5, with examples of particularly suitable extinction ratios including at least about 30:1, and with examples of even more particularly suitable extinction ratios including at least about 50:1. Because reflective polarizing film 68 serves primarily as a thermal-management polarization device, this level of extinction ratio is acceptable. High contrast of light beam 22G(i) may subsequently be obtained with the use of exit polarizer 70.

Figure 6A:
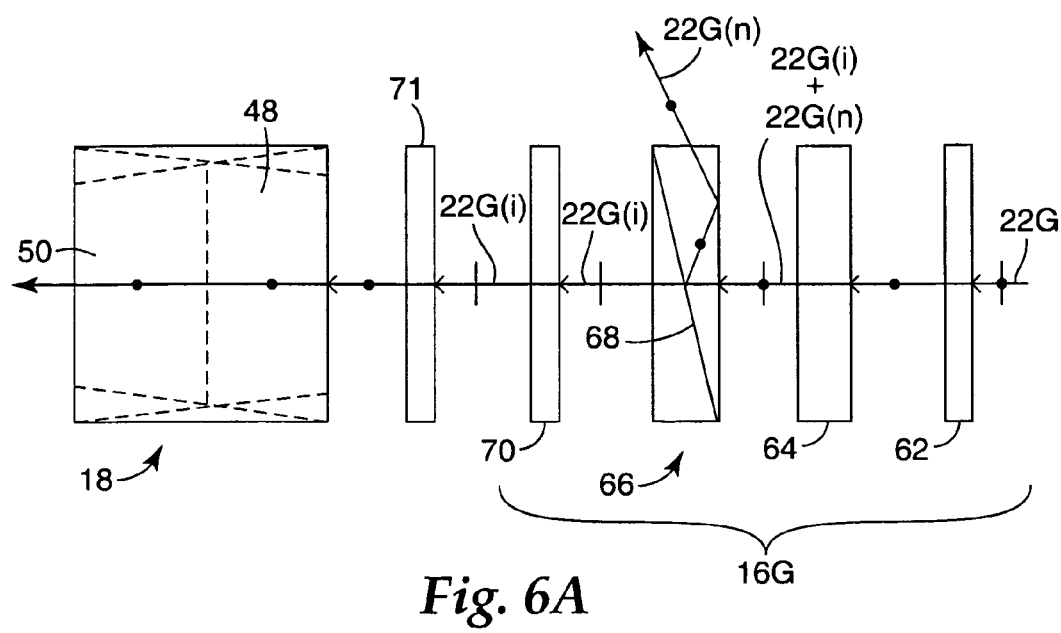
FIGS. 6A and 6B are expanded side schematic views of imaging components of the projection system, each of which focus on an alternative green-wavelength imaging component in use with a color combiner.
Figure 6B:
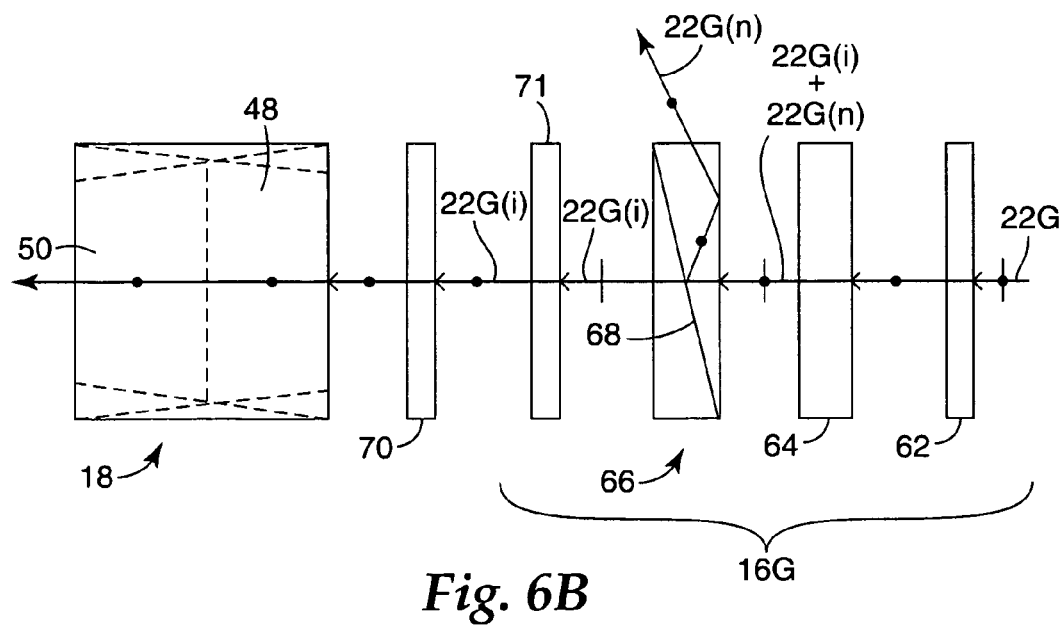

FIGS. 6A and 6B are also expanded top schematic views of optic core 15, and are alternative embodiments to that shown in FIG. 4. As shown in FIG. 6A, imaging component 16G may also include ½-wave plate 71 located between exit polarizer 70 and color combiner 18. In this embodiment, reflective polarizing film 68 is oriented in the same direction as reflective polarizing films 46 and 58 of imaging components 16R and 16B (i.e., in this embodiment, reflective polarizing film 68 is not rotated 90° relative to reflective polarizing films 46 and 58). As such, reflective polarizing film 68 reflects s-polarized light relative reflective polarizing film 68, and transmits p-polarized light relative reflective polarizing film 68.

In the same manner as light beams 22R and 22B, light beam 22G(n) enters PBS 66 in the first polarization state and light beam 22G(i) enters PBS 66 in the second polarization state. Thus, light beam 22G(n) substantially reflects from reflective polarizing film 68 and light beam 22G(i) transmits through reflective polarizing film 68. Light beam 22G(i) then transmit out of PBS 66 and through exit polarizer in the second polarization state. However, ½-wave plate 71 modulates the polarization state of light beam 22G(i) such that light beam 22G(i) exits ½-wave plate 71 substantially in the first polarization state, as shown in FIG. 6A. This allows light beam 22G(i) to be p-polarized with respect to dichroic mirrors 48 and 50 of color combiner 18, as discussed above in FIG. 4.

As shown in FIG. 6B, ½-wave plate 71 may alternatively be located between PBS 66 and exit polarizer 70. In this embodiment, light beam 22G(i) may be modulated from the second polarization state to substantially the first polarization state prior to contacting exit polarizer 70. Accordingly, exit polarizer 70 is designed to transmit light in the first polarization state.

The embodiments shown in FIGS. 6A and 6B are beneficial because light beam 22G(i) transmits through reflective polarizing film 68 as p-polarized light relative to reflective polarizing film 68 (rather than as s-polarized light, as discussed above in FIG. 4), while also transmitting through color combiner 18 as p-polarized light with respect to dichroic mirrors 48 and 50. As a result, the embodiments shown in FIGS. 6A and 6B provide high transmissions of light beam 22G(i).

An alternate embodiment of the invention could utilize an "SSS" type X-cube. In this embodiment, a color combiner includes a pair of crossing dichroic films that respectively reflect red-wavelength light and blue-wavelength light, and transmit green wavelength light. The color combiner reflects s-polarized light in the red and blue channels more strongly than p-polarized light. It is also configured to maximize transmission of s-polarized light in the green channel. Typically, the "SSS" type X-cube is less efficient and more costly than present "SPS" type X-cubes.

Figure 7:
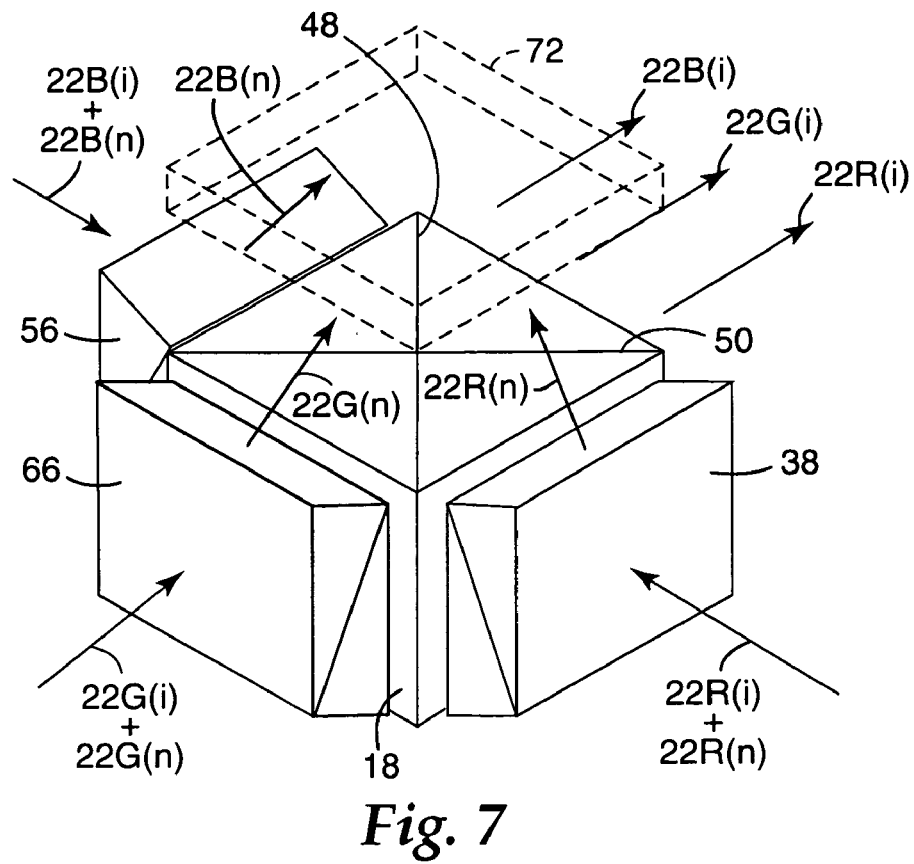
FIG. 7 is a top perspective view of polarizing beam splitters of the imaging components in use with the color combiner.

FIG. 7 is a top perspective view of PBSs 38, 56, and 66 in use with color combiner 18 (the remaining portions of optic core 15 are omitted for ease of discussion). As shown, light beams 22R, 22B, and 22G respectively enter PBSs 38, 56, and 66 with both the image portions and the non-image portions. Because PBSs 38 and 56 reflect light 20 in the first polarization state, and PBS 66 reflects light in the second polarization state, light beams 22G(n), 22B(n), and 22R(n) are reflected out of their respective PBSs in the same directions above a plane defined by light beams 22R(i), 22B(i), and 22G(i).

The term "in the same direction above a plane defined by the image portion of the light beams", and the like, herein refers to optical paths that have components directed above a plane generally defined by the vectors of light beams 22R(i), 22B(i), and 22G(i) (which extend in the same plane as the incoming light beams 22R, 22B, and 22G in FIG. 7). For example, as shown in FIG. 7, light beams 22R(n), 22B(n), and 22G(n) respectively exit PBSs 38, 56, and 66 above light beams 22R(i), 22B(i), and 22G(i). Alternatively, light beams 22R(n), 22B(n), and 22G(n) may exit PBSs 38, 56, and 66 below light beams 22R(i), 22B(i), and 22G(i). These examples are in contrast to an orientation where one or more of PBSs 38, 56, and 66 are rotated by 90° around its optic axis, causing at least one non-image light beam to exit in the plane of the PBSs. In this comparative situation, the reflected non-image light beam would laterally exit the given PBS, which may interfere with other optical paths, and which prevents the given non-image light beam from being directed to above the plane with the remaining non-image light beams.

The actual vector directions of light beams 22R(n), 22B(n), and 22G(n) may vary based on the angles that the given light beams reflect from their respective PBSs (discussed below). Nonetheless, a single heat removal component (e.g., light absorption device 72, shown in phantom in FIG. 7) may be positioned to absorb the incoming light beams 22R(n), 22B(n), and 22G(n). As discussed above, this transfers the heat generated by light beams 22R(n), 22B(n), and 22G(n) from the locations that are heat sensitive (e.g., polymeric polarizer films in imaging components 16R, 16B, and 16G) to an offset location where the heat generation may be managed with a single heat removal component.

Light absorption device 72 may be any type of heat sink and/or light absorber that is capable of tolerating much higher temperatures than can be tolerated by absorptive-type polarizers. The life of a typical absorptive-type polarizer is highly dependent on maintaining its temperature below acceptable limits, whereas a light absorber (e.g., light absorption device 72) located outside the optic path of projection system 10 may be constructed from materials capable of tolerating much higher temperatures, and these materials do not need high optical quality like those components in the image beam do. This leads to efficient heat transfer properties for projection system 10, which correspondingly requires less air flow, and therefore, smaller or fewer fans to achieve the desired rate of energy transfer. Placing light absorption device 72 to absorb each of light beams 22R(n), 22B(n), and 22G(n) allows the use of less airflow compared to the airflow necessary over an absorptive-type polarizer. Lower airflow provides many advantages, such as fewer fans, smaller fan sizes, less fan noise, reduced power supply requirements, smaller overall projection system size and weight, less frequent need to change air filters, and combinations thereof.

Figure 8:
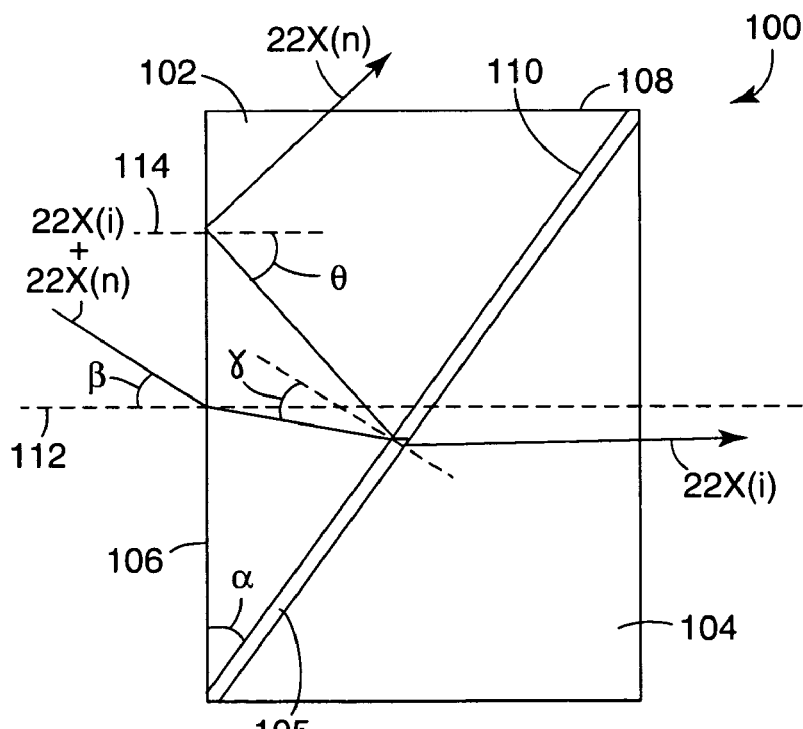
FIG. 8 is a side schematic view of an exemplary polarizing beam splitter separating an image portion and non-image portion of an incident light beam.

FIG. 8 is a side schematic view of PBS 100, which is an example of a suitable PBS for each of PBSs 38, 56, and 66 to separate the image portion and non-image portion of light beam 22X, where light beam 22X is representative of any of light beams 22R, 22B, and 22G. The image portion of light beam 22X is referred to as "light beam 22X(i)" and the non-image portion of light beam 22X is referred to as "light beam 22X(n)".

As shown, PBS 100 includes input prism 102, output prism 104, and reflective polarizing film 105. Input prism 102 and output prism 104 are low-birefringence prisms, disposed adjacent each other on opposing sides of reflective polarizing film 105. Suitable materials for input prism 102 and output prism 104 are the same as discussed above for input prism 42 and output prism 44. Input prism 102 includes entrance surface 106, top surface 108, and incident surface 110, where incident surface 110 is oriented at an orientation angle α relative to entrance surface 106. Because reflective polarizing film 105 is disposed against incident surface 110, reflective polarizing film 105 is also oriented at angle α relative to entrance surface 106.

Light beam 22X travels through entrance surface 106 at an incident angle β relative to orthogonal axis 112 and is refracted, according to the refractive indices of the input prism 102 and its adjacent medium (typically air). Reflective polarizing film 105 then separates light beam 22X by transmitting light beam 22X(i) through output prism 104, and reflecting light beam 22X(n) back into input prism 102. Light beam 22X(n) is reflected back toward entrance surface 106 at an incident angle θ relative to orthogonal axis 114. The incident angle θ is determined by the incident angle β, the orientation angle α, and the refractive index of input prism 102. When the incident angle θ is less than or equal to $\sin^{-1}(1/n)$, where "n" is the refractive index of the material of input prism 102, light beam 22X(n) is totally internally reflected by entrance surface 106. Accordingly, when the orientation angle α satisfies Equation 1:

$$\alpha \geq \frac{\left\{\sin^{-1}\left(\frac{1}{n \times \sin\beta}\right) + \sin^{-1}\left(\frac{1}{n}\right)\right\}}{2} \quad \text{(Equation 1)}$$

light beam 22X(n) is totally reflected by entrance surface 106. Examples of suitable refractive indices for input prism 102 range from about 1.4 to about 1.6. Therefore, orienting reflective polarizing film 105 such that orientation angle α satisfies Equation 1 effectively prevents light beam 22X(n) from transmitting through entrance surface 106. This allows substantially all of reflected light beams 22G(n), 22B(n), and 22R(n) to be directed in the same general direction above or below the plane defined by light beams 22G(i), 22B(i), and 22R(i).

Additionally, as discussed above in FIG. 4, for reflective polarizing films that are rotated by 90° to reflect p-polarized light, the incoming light beam 22X desirably exhibits a small incident angle "γ" relative to orthogonal axis 116 (e.g., about 25° or less), where incident angle γ is also based on the incident angle β, the orientation angle α, and the refractive index of input prism 102. Accordingly, for situations where reflective polarizing film 105 is rotated by 90° (such as with reflective polarizing film 68) the orientation angle α of reflective polarizing film 105 may be selected such that (1) light beam 22X(n) undergoes a total internal reflection, (2) the incident angle γ is small enough that the transmission of s-polarized light is only slightly lower than the transmission of p-polarized, and (3) the extinction ratio for a reflective polarizing film that reflects p-polarized light is still adequate (at least about 70:1). This allows light beam 22X(i) to transmit through PBS 100 with good transmission intensity, while also allowing light beam 22(n) to be totally internally reflected in a direction above the plane defined by the image portions of the light beams.

Referring back to FIGS. 2-4, examples of suitable polarizing films for one or more of polarizing films 46, 58, and 68 include multi-layer polymeric, matched z-index polarizer (MZIP) films, in which the z-refractive index of the birefringent material is substantially the same as the y-refractive index of the birefringent material. Examples of suitable polarizing films having a matched z-index are described in Jonza et al., U.S. Pat. No. 5,882,774 and U.S. Pat. No. 5,962,114; Bruzzone et al., U.S. Pat. No. 6,486,997; Weber et al., U.S. Pat. No. 6,609,795; Jackson et al., U.S. Pat. No. 6,916,440 and U.S. Pat. No. 6,936,209; Merill et al., U.S. Pat. No. 6,939,499 and U.S. Pat. No. 6,949,212; and in the co-assigned U.S. Patent Application Ser. No. 60/294,940, filed May 31, 2001.

In one embodiment, the polarizing film may include alternating layers of different materials, at least one of which is birefringent and oriented. Films which function well in glass prisms may also include additional features to provide appropriate values of the anisotropic indices of refraction for each layer, especially in the direction normal to the surface of the film. Specifically, the indices of refraction in the thickness direction of the film of the alternating layers are ideally matched. This is in addition to the indices in the y-direction (pass direction) of the polarizer being matched. For a polarizing film to have high transmission along its pass axis for all angles of incidence, both the y and z (normal to the film) indices of the alternating layers may be matched. Achieving a match for both the y and z indices may utilize a different material set for the layers of the film than that used when only the y index is matched.

One technique for matching both the y and z indices of all the layers is to impart a true uniaxial stretch where the film is allowed to relax (i.e., shrink) in both the y and z directions while it is being stretched in the x direction. In such a manner, the y and z indices of refraction are the same in a given layer. It then follows that if a second material is chosen that matches the y index of the first material, the z indices must also match because the second material layers are also subjected to the same stretching conditions.

In general, the mismatch in index between the y indices of the two materials should be small for high transmission in the pass state while maintaining high reflectance in the block state. The allowed magnitude of the y index mismatch can be described relative to the x index mismatch because the latter value suggests the number of layers used in the polarizer thin film stack to achieve a desired degree of polarization. The total reflectivity of a thin film stack is correlated with the index mismatch Δn and the number of layers in the stack N (i.e., the product $(\Delta n)^2 \times N$ correlates to the reflectivity of a stack). For example, to provide a film of the same reflectivity but with half the number of layers requires $\sqrt{2}$ times the index differential between layers, and so forth. The absolute value of the ratio $\Delta n_y / \Delta n_x$ is the relevant parameter that is desirably controlled, where $\Delta n_y = n_{y1} - n_{y2}$ and $\Delta n_x = n_{x1} - n_{x2}$ for first and second materials in an optical repeat unit as described herein. It is preferred that the absolute value of the ratio of $\Delta n_y / \Delta n_x$ is no more than 0.1, more preferably no more than 0.05, and even more preferably no more than 0.02, and, in some instance, this ratio can be 0.01 or less. Preferably, the ratio $\Delta n_y / \Delta n_x$ is maintained below the desired limit over the entire wavelength range of interest (e.g., over the visible spectrum). Typically, $\Delta n_x$ has a value of at least 0.1, and can be 0.14 or greater.

In many practical applications, a small z index mismatch between these layers is acceptable, depending on the angle the incident light makes to the film layers. However, when the film is laminated between glass prisms (i.e., immersed in a high index medium) the light rays are not bent toward the normal to the film plane. In this case, a light ray will sense the z index mismatch to a much greater degree compared to incidence from air, and a light ray of y-polarized light will be partially or even strongly reflected in z-mismatched films. A closer z index match may be preferred for light rays having a greater angle to the film normal inside the film. However, when the film is laminated between glass prisms having a lower index of refraction (e.g., n=1.60), the light rays are bent more toward the normal to the film plane. Therefore, the light rays will sense the z index mismatch to a lesser degree. With the same z index mismatch, reflection of p-polarized light will be generally lower when using low index prisms than when using high index prisms. Transmission of p-polarized light, therefore, may be higher when using low index prisms than when using a high index prism with the same films.

The allowed magnitude of the z index mismatch, like the y index mismatch, can be described relative to the x index mismatch. The absolute value of the ratio of $\Delta n_z/\Delta n_x$ is the relevant parameter that is desirably controlled, where $\Delta n_z = n_{z1} - n_{z2}$ and $\Delta n_x = n_{x1} - n_{x2}$ for first and second materials in an optical repeat unit as described herein. For a PBS film intended for use in air, the absolute value of the ratio $\Delta n_z/\Delta n_x$ is preferably less than 0.2. For film immersed in a higher index medium such as glass, the absolute value of the ratio $\Delta n_z/\Delta n_x$ is preferably less than 0.1 and more preferably less than 0.05, and can be 0.03 or lower for incident light having a wavelength at 632.8 nanometers. Preferably, the ratio $\Delta n_z/\Delta n_x$ is maintained below the desired limit over the entire wavelength range of interest (e.g., over the visible spectrum). Typically, $\Delta n_x$ has a value of at least 0.1 and can be 0.14 or greater at 632.8 nanometers.

The multi-layer polymeric MZIP films are particularly beneficial for use with projection system 10 because they may be oriented at a 90° rotation to transmit s-polarized light and reflect p-polarized, as discussed above for reflective polarizing film 68 in FIG. 4. This allows good transmission of green-wavelength light beams (e.g., light beam 22G(i)) while also allowing the non-image light beams (e.g., light beam 22G(n)) to be reflected in the same direction above or below the plane defined by the image portions of the light beams (e.g., light beams 22R(i), 22B(i), and 22G(i)). This allows the non-image light beams to be conditioned with a heat removal component at a location offset from the optic paths of projection system 10.

Figure 9:
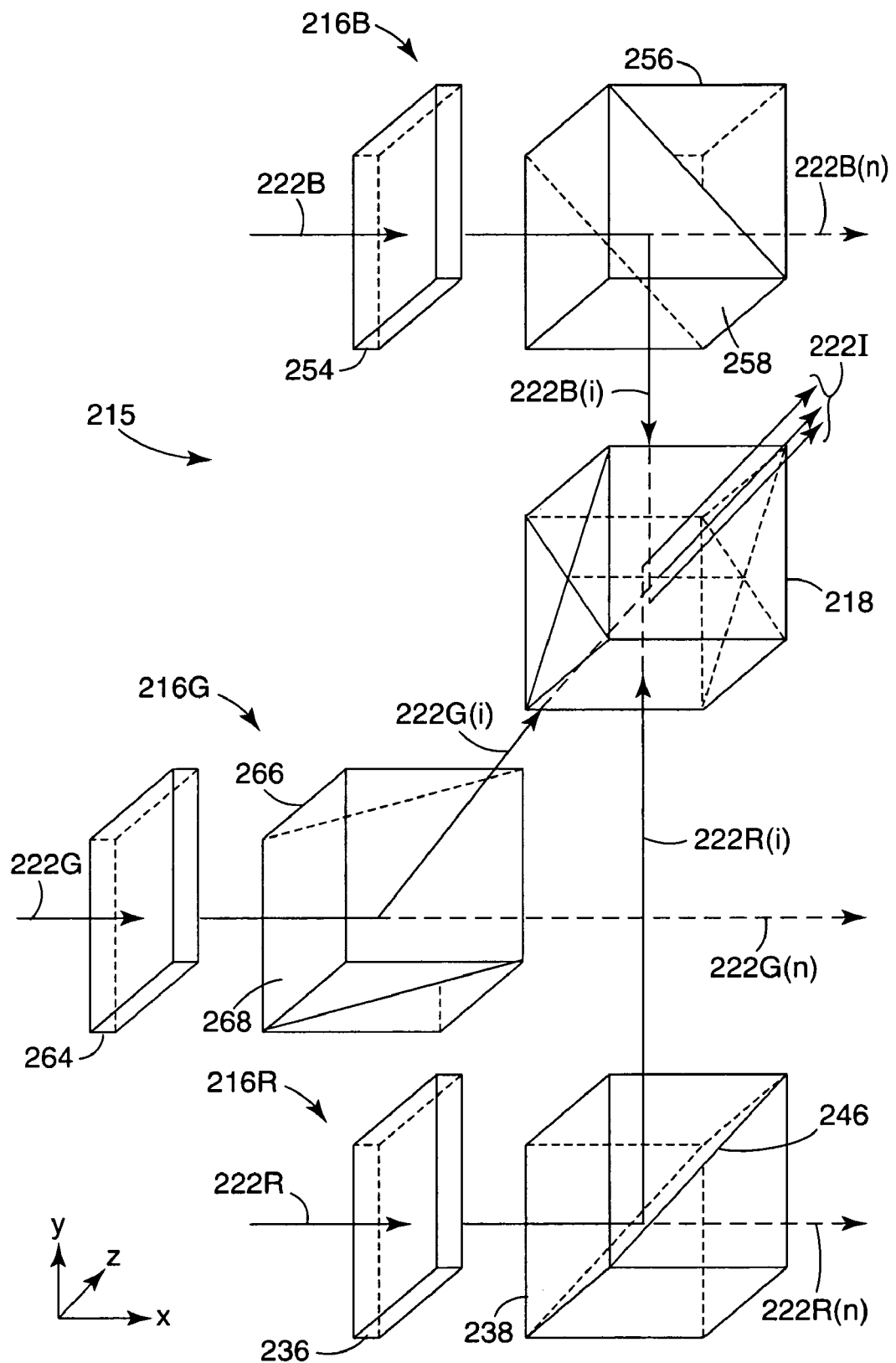
FIG. 9 is an exploded schematic view of an alternative optic core for use in the projection system of the present invention.

FIG. 9 is an exploded schematic view of optic core 215, which is an alternative optic core to optic core 15 discussed above in FIGS. 1-4, where the reference labels of the respective components are increased by "200". The respective entrance polarizers and exit polarizers have been omitted from FIG. 9 for ease of discussion. The components of optic core 215 function in the same manner as discussed above for optic core 15, except that PBSs 238, 256, and 266 transmit the non-image portions of the respective light beams (i.e., light beams 222R(n), 222B(n), and 222G(n)) and reflect the image portions of the respective light beams (i.e., light beams 222R(i), 222B(i), and 222G(i)).

As shown, PBS 238 of imaging component 216R and PBS 256 of imaging component 216B each extend along a y-axis with color combiner 218, where the y-axis is shown as a vertical direction in FIG. 9. Imagers 236 and 254 each extend along an x-axis with PBSs 238 and 256, respectively, where the x-axis is shown as a horizontal direction in FIG. 9. PBS 266 of imaging component 216G extends along a z-axis with color combiner 218, where the z-axis is orthogonal to the x-axis and the y-axis. Imager 264 correspondingly extends along the x-axis with PBS 266. As further shown, light beams 222R(i), 222B(i), and 222G(i) have vector components that define a plane taken along the y-axis and the z-axis.

In this embodiment, light beams 222R(i) and 222B(i) (after reflection from the PBSs 238 and 256) are in the first polarization state and 222G(i) is in the second polarization state after reflection from PBS 266. It is noted that use of the terms "first polarization state" and "second polarization state" with respect to the embodiment shown in FIG. 9, designate relative polarization states rather than absolute states, are not necessarily the same as the "first polarization state" and "second polarization state" used for the embodiments discussed above in FIGS. 1-7. In fact, the arrangement shown in FIG. 9 is an opposite arrangement from that discussed above for optic system 15, and allows light beams 222R(i), 222B(i), and 222G(i) to reflect from reflective polarizing films 246, 258, and 268, respectively.

Due to the orientation of imaging components 216R, 216B, and 216G relative to color combiner 218, reflective polarizing films 246 and 258 (of imaging components 216R and 216B) may be oriented at a 90° rotation relative to reflective polarizing film 268 of imaging component 216G. As a result, reflective polarizing films 246 and 258 each reflect light that is p-polarized relative to the reflective polarizing film and transmit light that is s-polarized relative to the reflective polarizing film. As a result, light beams 222R(i) and 222B(i) are s-polarized relative to dichroic mirrors 248 and 250, as discussed above in FIGS. 2 and 3. In comparison, light beam 222G(i) is p-polarized relative to dichroic mirrors 248 and 250, which provides a high transmission of the green-wavelength light, as discussed above in FIG. 4.

As further shown in FIG. 9, reflective polarizing films 246, 258, and 268 are oriented at 45° angles within PBSs 238, 256, and 266, which causes beams 222R(i), 222B(i), and 222G(i) to reflect from reflective polarizing films 246, 258, and 268 without total internal reflections. Additionally, a projection system incorporating optic core 215 generally requires additional fold reflectors for light beam 222G to attain the three-dimensional orientation shown in FIG. 9.

Light beams 222R(n), 222B(n), and 222G(n) respectively transmit through PBSs 238, 256, and 266 in the same direction above (or below) the plane defined by light beams 222R(i), 222B(i), and 222G(i) (i.e., the y-z plane). This directs the non-image light beams beyond the optic path shown in FIG. 9, which prevents the non-image light beams from interfering with the optic path. Additionally, light beams 222R(n), 222B(n), and 222G(n) may be directed toward a single heat removal component (not shown) that absorbs the light energy, as discussed above. This transfers the heat generation incurred by light beams 222R(n), 222B(n), and 222G(n) from the locations that are heat sensitive (e.g., imaging components 216R, 216B, and 216G) to an offset location where the heat generation may be managed with a single heat removal component.

Although the present invention has been described with reference to preferred embodiments, workers skilled in the art will recognize that changes may be made in form and detail without departing from the spirit and scope of the invention.

The invention claimed is:

1. A projection system comprising:
   a first imaging component comprising:
      a first imager; and
      a first reflective polarizer configured to at least partially separate a first light beam from the first imager into a first portion and second portion, the first portion and the second portion having substantially orthogonal polarization states;
   a second imaging component, comprising:
      a second imager; and
      a second reflective polarizer configured to at least partially separate a second light beam from the second imager into a third portion and a fourth portion, the third portion and the fourth portion having substantially orthogonal polarization states, wherein the first portion and the third portion are directed in the same direction above or below a plane defined by the second and fourth portions; and
   a color combiner configured to combine the second portion and the fourth portion, wherein the second portion and the fourth portion have substantially orthogonal polarization states prior to entering the color combiner.

2. The projection system of claim 1, wherein the first portion is reflected from the first reflective polarizer and the third portion is reflected from the second reflective polarizer.

3. The projection system of claim 2, wherein the first portion and the third portion have substantially orthogonal polarization states.

4. The projection system of claim 1, wherein the first imaging component further comprises a ½-wave plate disposed between the first reflective polarizer and the color combiner.

5. The projection system of claim 1, wherein the first imaging component further comprises an entrance polarizer disposed adjacent the first imager, opposite the first reflective polarizer.

6. The projection system of claim 1, wherein the first imaging component further comprises an exit polarizer disposed between the first reflective polarizer and the color combiner.

7. The projection system of claim 1, wherein the first reflective polarizer is a wire grid polarizer.

8. The projection system of claim 1, wherein the first reflective polarizer comprises a polarizing beam splitter having a reflective polarizing, multi-layer polymer film disposed between an input prism and an output prism.

9. The projection system of claim 8, wherein the input prism and an output prism each have a first refraction index and the first reflective polarizer has outer layers that each have a second refraction index, and wherein the first refraction indexes are substantially the same as the second refraction indexes.

10. The projection system of claim 8, wherein the input prism is configured so as to provide a total internal reflection surface.

11. The projection system of claim 8, wherein the first reflective polarizer comprises a matched z-index polarizer film.

12. The projection system of claim 11, wherein the first reflective polarizer is oriented at an incident angle relative to the central ray of a light cone forming the first light beam of about 25° or less.

13. The projection system of claim 11, wherein the first light beam has a wavelength ranging from about 500 nanometers to about 600 nanometers.

14. The projection system of claim 1, further comprising:
   a light source configured to emit a white light beam; and
   at least one dichroic mirror for separating the white light beam into a plurality of color light beams, wherein the first light beam is a first of the color light beams and the second light beam is a second of the color light beams.

15. The projection system of claim 1, wherein the first and second reflective polarizers have inherent polarization reflection axes based on their internal structure, and the polarization reflection axis of the first reflective polarizer is orientated at a 90° rotation about its optic axis relative to the orientation of the polarization reflection axis of the second reflective polarizer with respect to its optic axis.

16. A projection system comprising:
   a plurality of imaging components, each comprising:
      a transmissive imager configured to receive an incident color light beam and impose an image on the incident color light beam to produce an output color light beam having an image portion in a first polarization state and a non-image portion in a second polarization state that is substantially orthogonal to the first polarization state; and
      a reflective polarizer configured to receive the output color light beam from the transmissive imager, and further configured to at least partially separate the image portion of the output color light beam from the non-image portion of the output color light beam;
      wherein the reflective polarizers of the plurality of imaging components are configured to direct the non-image portions of the output color light beams in the same direction above or below a plane defined by the image portions of the output color light beams; and
   a color combiner configured to combine the image portions of the output color light beams from the reflective polarizers.

17. The projection system of claim 16, further comprising a heat removal component located at an offset location from the plurality of imaging components, wherein the non-image portions of the output color light beams are directed toward the heat removal component.

18. The projection system of claim 16, wherein the color combiner is an SPS-type X-cube color combiner.

19. The projection system of claim 16, wherein the reflective polarizer comprises a multi-layer polymer polarizing film.

20. The projection system of claim 19, wherein the multi-layer polymer polarizing film comprises a matched z-index polarizer film.

* * * * *

UNITED STATES PATENT AND TRADEMARK OFFICE
CERTIFICATE OF CORRECTION

PATENT NO. : 7,673,993 B2
APPLICATION NO. : 11/315723
DATED : March 9, 2010
INVENTOR(S) : Jiaying Ma It is certified that error appears in the above-identified patent and that said Letters Patent is hereby corrected as shown below:

Title Page Item (56) (Other Publications)
Line 2, delete "Jersery," and insert -- Jersey, --, therefor.

Column 3
Line 50, delete "may" and insert -- may be --, therefor.

Column 4
Line 58, delete "(LCOS)" and insert -- (LCoS) --, therefor.

Column 10
Line 11, after "light" delete "20".

Signed and Sealed this

Fourteenth Day of September, 2010

David J. Kappos
*Director of the United States Patent and Trademark Office*